United States Patent [19]

Clark

[11] 3,919,977
[45] Nov. 18, 1975

[54] SEED FEEDING DEVICE FOR BIRDS
[76] Inventor: Robert Bruce Clark, 1100 McGreger St., Apt. 714, Montreal, Quebec, Canada
[22] Filed: June 13, 1974
[21] Appl. No.: 478,849

[52] U.S. Cl. ................................ 119/18; 119/52 R
[51] Int. Cl.² .......................................... A01K 39/00
[58] Field of Search ..................... 119/18, 51.5, 52 R

[56] References Cited
UNITED STATES PATENTS

| | | | |
|---|---|---|---|
| 1,895,435 | 1/1933 | Ahrens | 119/51.5 |
| 2,031,874 | 2/1936 | Butler et al. | 119/18 |
| 3,415,226 | 12/1968 | Cheung | 119/18 |
| 3,712,267 | 1/1973 | Moliterni | 119/18 |

Primary Examiner—Hugh R. Chamblee
Attorney, Agent, or Firm—Roland L. Morneau

[57] ABSTRACT

A seed feeding device for birds having a storage enclosure with an open ended bottom, a trough disposed below said bottom made of a sloping lower plate to allow the seeds to slide outside the open ended bottom through a narrow horizontal aperture into a portion of the trough outside the lower end of the enclosure. A perch is located adjacent the trough to allow the bird standing on the perch to retrieve seeds forwardly located in a restricted portion of the trough. A waste plate slopingly disposed below the perch is adapted to receive droppings and allow them to slide in a waste collecting drawer below the plate.

5 Claims, 3 Drawing Figures

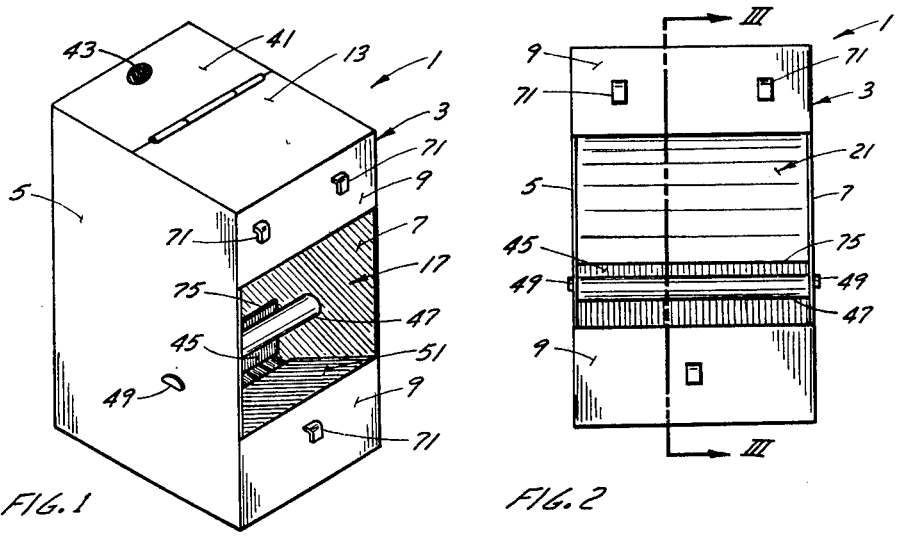
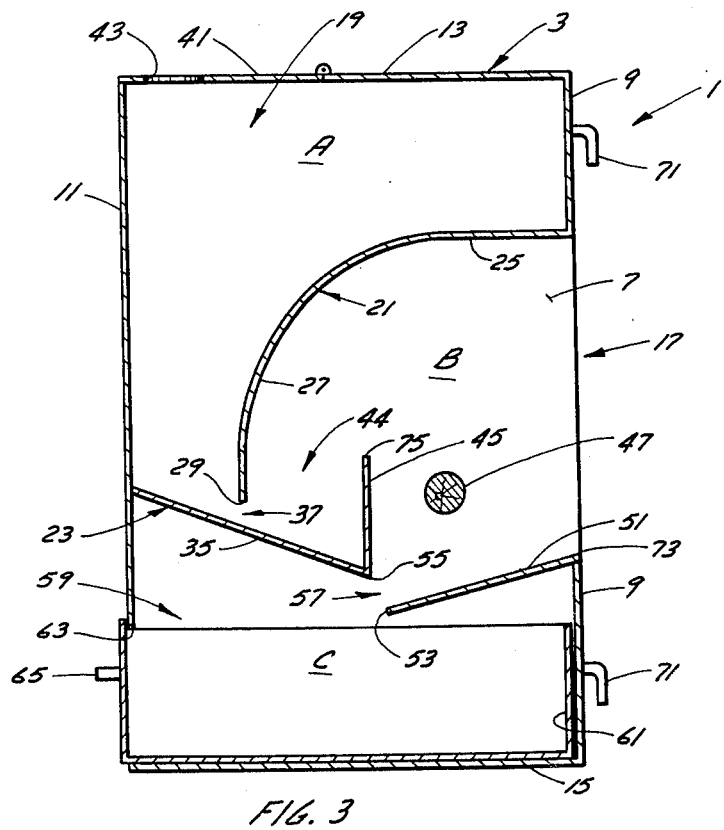

SEED FEEDING DEVICE FOR BIRDS

BACKGROUND OF THE INVENTION

1. Field of the Invention

This invention relates to an improved life support device for birds.

2. Description of the Prior Art

Life support devices for birds, in the form of feeding or watering devices, are known. The known devices however have disadvantages. They cannot hold a relatively large supply of food or water and substantially, continuously dispense it in small amounts. Thus they require frequent attendance. Also, the known devices, when used on a bird cage, are susceptible to having the feed or water soiled by waste feed material or bird waste, or else result in the bird waste and/or waste feed material soiling the floor of the cage on to which they are attached.

SUMMARY OF THE INVENTION

It is the purpose of the present invention to provide a bird life support device, and particularly a bird feeder, which minimizes or avoids the above disadvantages. More particularly, the bird life support device of the present invention provides a continuous supply of small amounts of life support material, such as feed or water, from a large supply in comparison to the normally small supplies of feed or water supplied by known life support devices. The life support device of the present invention also is arranged to minimize the possibility of the bird soiling or dirtying its food or water as it eats or drinks and also to minimize the possibility of the bird soiling or dirtying the bottom of its cage when the device is attached to the cage. The device is arranged to collect waste food droppings and bird droppings and provide for their removal from the device and the vicinity of the cage. The device is arranged to be hung adjacent the outside of a bird cage so it does not take away space within the cage. While particularly suited for use with a bird cage, the device can also however be used to feed or water birds outdoors. The device is simple in construction, lightweight, and easy to load, mount and clean.

The invention is particularly directed toward a bird life support device having a storage space for holding a relatively large amount of life support material and an open trough at the bottom of the storage area for holding a relatively small amount of life support material. Means connect the storage space to the trough for substantially continually replenishing the trough with life support material from the storage space as the material is consumed from the trough by a bird.

The device preferably includes a perch for the bird in front of the trough. An opening is provided in front of the device for giving access for the bird to the perch.

The device also preferably includes means beneath the trough for collecting waste material. Means can be provided for removing the collected waste material from the device.

DESCRIPTION OF THE DRAWINGS

The invention will now be described in detail having reference to the accompanying drawings in which:

FIG. 1 is a perspective view of the feeder;

FIG. 2 is a front elevation view of the feeder; and

FIG. 3 is a cross-sectional elevation view taken along line III—III of FIG. 2.

DESCRIPTION OF THE PREFERRED EMBODIMENTS

The bird life support device 1 of the present invention is particularly adapted as a bird feeder. To this end, the device has an outer shell 3 defining a bird feed storage region A, a feeding region B and a waste region C as shown in FIG. 3. The shell 3 includes a pair of side walls 5, 7, a front wall 9 and a back wall 11. The shell 3 also preferably includes a top wall 13 and a bottom wall 15. An opening 17 is provided in the middle of the front wall 9 providing access for the bird to the interior of the shell 3.

Located in the upper portion of the outer shell 3 is the bird feed storage region A. This region A is defined by a storage space 19 bounded, in part, by a storage front wall 21 and a storage bottom wall 23. The front and bottom storage walls 21, 23 extend between, and are joined to, the side walls 5, 7. A portion of side walls 5, 7, together with portions of front wall 9 and back wall 11 also serve to define the boundaries of storage space 19. The front storage wall 21 preferably has a top portion 25 which extends in horizontal direction in from the front wall 9 of the shell 3, and a downwardly curved lower portion 27 which terminates in a horizontal, bottom free edge 29. The top storage wall portion 25 preferably is spaced some distance below top shell wall 13 to provide a large storage space 19. The upper front portion of this storage space 19, above opening 17, is closed by a portion of front wall 9.

The bottom storage wall 23 preferably comprises a plate 35 sloping down from shell back wall 11 toward the shell front wall 9 and spaced below free edge 29 of the front storage wall 21 to form a feed opening 37. Storage space 19 is filled with bird feed from the top. To this end, the top wall 13 of shell 3, forming a part of the storage area, can have a hinged panel 41 which, when lifted, by a finger hole 43, allows the storage space 19 to be filled with bird seed. The storage space 19 could also be used with the top wall 17, including panel 41, being omitted.

The feeding region B includes a trough 44 having a bottom wall, defined by the front portion of sloping plate 35 which plate extends past the lower storage wall portion 27 toward the front, and a vertical front wall 45. Plate 35 and front wall 45 can be made in one piece. The plate 35 and front wall 45 extend between, and are joined to, side walls 5, 7. Trough 44 holds a relatively small amount of bird feed as compared to storage space 19 and has a relatively narrow mouth. A cylindrical rod 47, forming a perch for the bird can be located in front of trough front wall 45. The perch 47 extends between side walls 5, 7 of shell 3, and is non-rotatably mounted in the side walls in a suitable manner. The non-rotatably mounting can comprise shaping the ends 49 of the rod into semicylinders and sliding the ends into correspondingly shaped holes in the side walls 5, 7.

The bird enters the feeding region B, located below, and in front of front storage wall 21 through opening 17 in the front wall of shell 3. The bird sits on perch 47 and eats from trough 44. As the trough 44 is emptied, it is automatically filled by bird seed flowing, under gravity, down from storage space 19, along sloping plate 35 and through feed opening 37.

A waste region C is preferably provided below storage region A and feeding region B. The waste region C includes a waste plate 51 which extends in from the front wall 9 of shell 3 toward the back wall 11, and slopes downwardly. The plate 51 terminates in a free edge 53 located below the corner 55 defined by the juncture of plate 35 and trough front wall 45. The narrow space between edge 53 and corner 55 defines a waste opening 57. This opening is made small enough so that a bird cannot pass through the opening from feeding region B to waste region C. The plate 51 extends between, and can be joined to, side walls 5, 7. The plate 51 defines the bottom of feeding region B and the top of waste region C.

The space 59 beneath corner 55 is preferably provided with an open-top drawer 61 which enters into space 59 through an opening 63 in back wall 11. The drawer 61 can run along bottom wall 15. The front of space 59 is closed by a portion of front wall 9. Drawer 61 slides beneath free edge 63 of plate 51. The drawer 61 has a handle 65 at its back end.

Waste, in the form of uneaten seed, husks from the bird seed as the bird eats, and bird droppings fall, onto waste plate 51 and slide down into waste space 59 and into drawer 61. The drawer 61 is periodically emptied from the back of outer shell 3. Plate 51 can, if desired be removably mounted in shell 3 so that it can also be periodically removed and cleaned. The plate 51 can also be connected to the front of drawer 61 so that it can be cleaned when drawer 61 is withdrawn.

The feeder is particularly designed to be attached to a bird cage on the outside thereof, with opening 17 aligned with an opening in the bird cage. To this end, suitably attaching means, such as for example, hooks 71, can be provided on the front wall 9 for hooking over horizontal bars on the cage. The attaching means, such as hooks 71, are made of material, such as metal, which birds do not peck at and damage.

While the device 1 has been shown equipped with a perch 47, this perch could be eliminated and the bird could instead perch on the corner 73 defined by the junction of waste plate 51 and lower front wall 9 or on a perch in the cage located adjacent opening 21.

The shell 3 of the device 1 is preferably provided with one or more transparent portions so that a person could see when the storage space 19 needs filling or when drawer 61 requires emptying. To this end, back wall 11, for example, could be made of suitably transparent material such as a clear plastic.

The device 1 could be readily adapted from a feeder to a water supply source by eliminating hinged panel 41 in top wall 13 and using instead, a continuous top wall 13 sealed to side, front and back walls 5, 7, 9 and 11. Space 19 is filled with water by inverting device 1 and introducing water trough opening 37. The device is then hung upright on the cage as before. When used as a water supply source it is essential to have the top edge 75 of wall 45 located above or higher than edge 29 defining the top of opening 37 when the device is upright. This ensures maintaining water within storage space 19 while water fills through 44 to a level even with edge 29. With the device employed as a water supply source the perch 47, plate 51 and drawer 61 can be provided or omitted as desired.

The device described has been illustrated as being relatively narrow. It is understood however that the device can be made wide enough to feed or water several birds at one time.

What I claim is:

1. A seed feeding device for birds comprising a housing having an opening trough one side thereof, the said device comprising;
   a storage enclosure vertically disposed in the upper part of said housing and away from said side provided with said opening, the said enclosure having an open ended bottom and adapted to contain a relatively large amount of seeds,
   a trough located below said open ended bottom and at about the level of said opening, the said trough comprising a bottom plate slopingly disposed downwardly in the direction of said opening, the said plate covering the said open ended bottom to close the latter and to leave a narrow aperture in a vertical plane along the lower edge of the bottom of the storage enclosure adjacent the said opening, the said plate extending downwardly beyond the enclosure, an upwardly extending wall secured along the lower edge of said plate to close the said trough, the upper edge of said wall being at a higher level then the upper edge of said narrow aperture, the distance between the said wall of the trough and the said open ended bottom being adapted to accommodate the head of the bird to reach for the seeds in the trough,
   a perch fixed to said housing and positioned between said wall and the side provided with said opening for receiving the bird in a standing position and allowing the latter to feed itself in the trough,
   a waste plate fixed to said housing below the perch between the said wall and the side provided with the said opening for receiving bird droppings and waste food droppings, the said waste plate being inclined in the direction of the trough, and
   collecting means in the lower part of the said housing and below said waste plate for receiving the said droppings sliding down the said inclined plate,
   whereby the seeds located in the storage enclosure are supported by the sloping plate of the trough and slide toward the narrow aperture between said plate of the trough and the storage enclosure for slowly and continuously replenishing the lower portion of the trough with seeds, the bird standing on the perch and facing the trough being positioned to retrieve seeds between the front wall and the lower part of the storage enclosure, the waste plate slopingly disposed below the perch being adapted to receive the droppings and to allow them to slide in the waste collecting means.

2. A device as recited in claim 1, wherein the said means for collecting droppings includes a drawer slidingly mounted along the lower portion of the said device below said trough and said waste plate, the said drawer being adapted to slide sideways outside the said device in a direction away from said opening.

3. A device as recited in claim 2, wherein the waste plate is secured to the top edge of the said drawer adjacent the side provided with said opening.

4. A device as recited in claim 1, wherein the distance between the free edge of the waste plate and the lower edge of the said wall of the trough is sufficiently large to allow droppings to pass therethrough and sufficiently small to prevent the bird from passing therethrough.

5. A device as recited in claim 1, wherein the storage enclosure extends toward the said perch up to the side of the housing provided with said opening to define room for the bird standing on the perch, hook means on the said side of the housing for attaching the device on the outer surface of a bird cage in front of an opening provided in said bird cage.

* * * * *